US012779649B2

(12) United States Patent
Su

(10) Patent No.: US 12,779,649 B2
(45) Date of Patent: Nov. 3, 2026

(54) DETACHABLE PNEUMATIC HAMMER TOOL

(71) Applicant: Hong Ann Tool Industries Co., Ltd., Taichung City (TW)

(72) Inventor: Cheng-Wei Su, Taichung City (TW)

(73) Assignee: Hong Ann Tool Industries Co., Ltd., Taichung City (TW)

( * ) Notice: Subject to any disclaimer, the term of this patent is extended or adjusted under 35 U.S.C. 154(b) by 0 days.

(21) Appl. No.: 19/304,313

(22) Filed: Aug. 19, 2025

(65) Prior Publication Data

US 2026/0138255 A1 May 21, 2026

(30) Foreign Application Priority Data

Nov. 20, 2024 (TW) ................................ 113144583

(51) Int. Cl.
*B25D 17/00* (2006.01)

(52) U.S. Cl.
CPC ................................ *B25D 17/005* (2013.01)

(58) Field of Classification Search
CPC .................................................... B25D 17/005
See application file for complete search history.

(56) References Cited

U.S. PATENT DOCUMENTS

2011/0209587 A1 * 9/2011 Urick, Sr. ............... B25B 19/00 81/177.85
2012/0055293 A1 * 3/2012 Urick ..................... B25D 17/02 81/177.85
2024/0238953 A1 * 7/2024 Spampatti ............... B25C 1/188

FOREIGN PATENT DOCUMENTS

TW M634583 U 11/2022

* cited by examiner

*Primary Examiner* — Eyamindae C Jallow
(74) *Attorney, Agent, or Firm* — Muncy, Geissler, Olds & Lowe, P.C.

(57) ABSTRACT

A detachable pneumatic hammer tool include a body, a pneumatic rod, and a connector. The body includes a tool head. The pneumatic rod has a first end configured to be connected to a pneumatic tool, and a second end detachably connected to the tool head. The connector is fixedly connected to the pneumatic rod.

9 Claims, 5 Drawing Sheets

DETACHABLE PNEUMATIC HAMMER TOOL

BACKGROUND OF THE INVENTION

The present invention relates to a pneumatic tool and, more particular, to a detachable pneumatic hammer tool.

Taiwan Utility Model Patent No. M634583 discloses an improved structure of pneumatic chisel head, which is mainly used in the field of pneumatic chisel hammers. A combination slot is provided on a chisel section of the pneumatic chisel head, and a combination blade having a harder and more robust structure is mounted in the combination slot and protrudes therefrom. The contact surface for chiseling an object is borne by the combination blade.

However, in the aforementioned pneumatic chisel head, the blade edge of the combination blade must extend radially from the chisel head body. If the combination blade is designed with a blade edge longer than the diameter of the chisel head, it occupies a larger space during packaging, thereby increasing the volume of the chisel head.

Thus, a need exists for a pneumatic hammer tool to mitigate and/or obviate the above disadvantages.

SUMMARY OF THE INVENTION

An objective of the present invention is to provide a detachable pneumatic hammer tool, which includes a body, a pneumatic rod, and connector. The body includes a tool head. The pneumatic rod has a first end configured to be connected to a pneumatic tool, and a second end detachably connected to the tool head. The connector is fixedly connected to the pneumatic rod.

In an embodiment, the tool head is provided with an insertion slot. The connector includes a fastener movable between a fastening position and a release position. When the fastener is in the fastening position, the fastener is inserted into the insertion slot to prevent detachment of the pneumatic rod from the tool head. When the fastener is in the release position, the fastener is disengaged from the insertion slot to allow detachment of the pneumatic rod from the tool head.

In an embodiment, the connector includes a first coupling seat and a second coupling seat. The first coupling seat is fixedly sleeved around an outer periphery of the pneumatic rod in a radial direction. One end of the second coupling seat is connected to the first coupling seat and another end is slidably sleeved onto the tool head in a direction parallel to an axial direction of the pneumatic rod.

In an embodiment, the second coupling seat is provided with a side hole corresponding to the insertion slot. One end of the fastener is provided with a fastening portion and another end is provided with a connecting portion. The fastening portion is inserted into the side hole and selectively inserted into or withdrawn from the insertion slot. The connector includes a control seat and a press button. The control seat is connected to a side of the first coupling seat opposite to the second coupling seat. The press button is reciprocally inserted into the control seat. One end of the press button protrudes from the control seat and another end is connected to the connecting portion so as to move synchronously with the fastener.

In an embodiment, the connector further includes an elastic member disposed in the control seat and sleeved around the press button. One end of the elastic member abuts against an inner periphery of the control seat, and another end abuts against the press button, such that the elastic member is configured to bias the press button and to drive the fastener toward the fastening position.

In an embodiment, the tool head is formed as a plate and is provided with a working portion and a back portion opposite to the working portion. One end of the pneumatic rod connected to the tool head is provided with a first coupling slot extending linearly in a radial direction of the pneumatic rod. The first coupling slot is sleeved on the back portion. The second coupling seat is provided with a second coupling slot linearly extending in the radial direction of the pneumatic rod. The second coupling slot is in communication with the side hole and is sleeved on the back portion.

In an embodiment, the back portion is recessed with a notch. The first coupling slot engages with the notch.

In an embodiment, the body includes a handle connected to one end of the tool head.

In an embodiment, one end of the first coupling seat is provided with a fixing portion, and another end is provided with an assembling portion. A collar portion is disposed between the fixing portion and the assembling portion. The collar portion is sleeved around the outer periphery of the pneumatic rod in the radial direction thereof and is fixed to the pneumatic rod via the fixing portion. The second coupling seat and the control seat are respectively connected to two opposite sides of the assembling portion.

In an embodiment, the first coupling seat is connected with a fixing member. The fixing member penetrates through the fixing portion and is threadedly connected to the pneumatic rod. The control seat is connected with two assembling members. The two assembling members respectively penetrate through the control seat and the assembling portion and are threadedly connected to the second coupling seat.

The present invention will become clearer in light of the following detailed description of illustrative embodiments of this invention described in connection with the drawings.

DETAILED DESCRIPTION OF THE INVENTION

Figure 1:
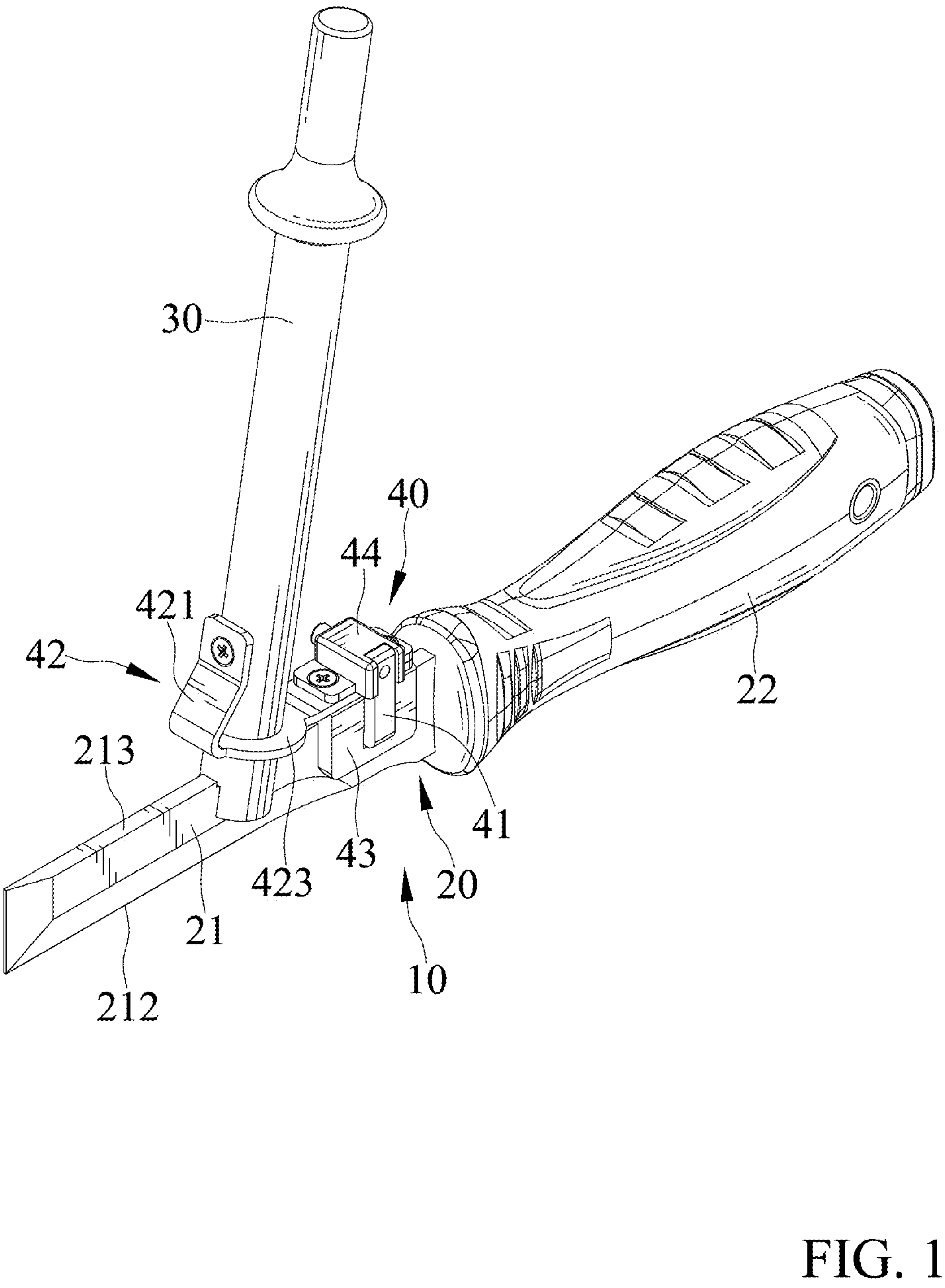
FIG. 1 is a perspective view of a detachable pneumatic hammer tool according to the present invention.
Figure 2:
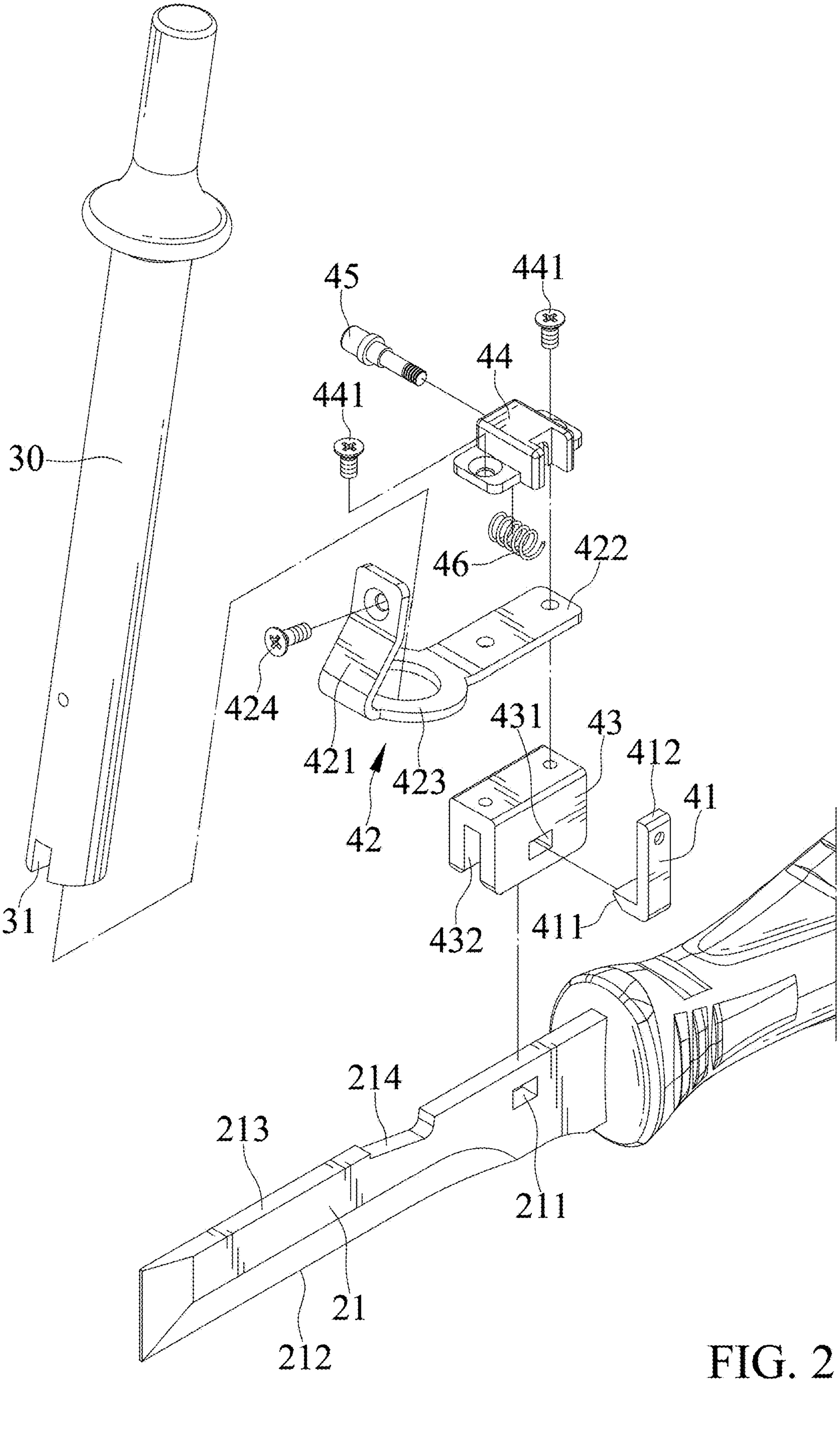
FIG. 2 is an exploded perspective view of the detachable pneumatic hammer tool according to the present invention.
Figure 3:
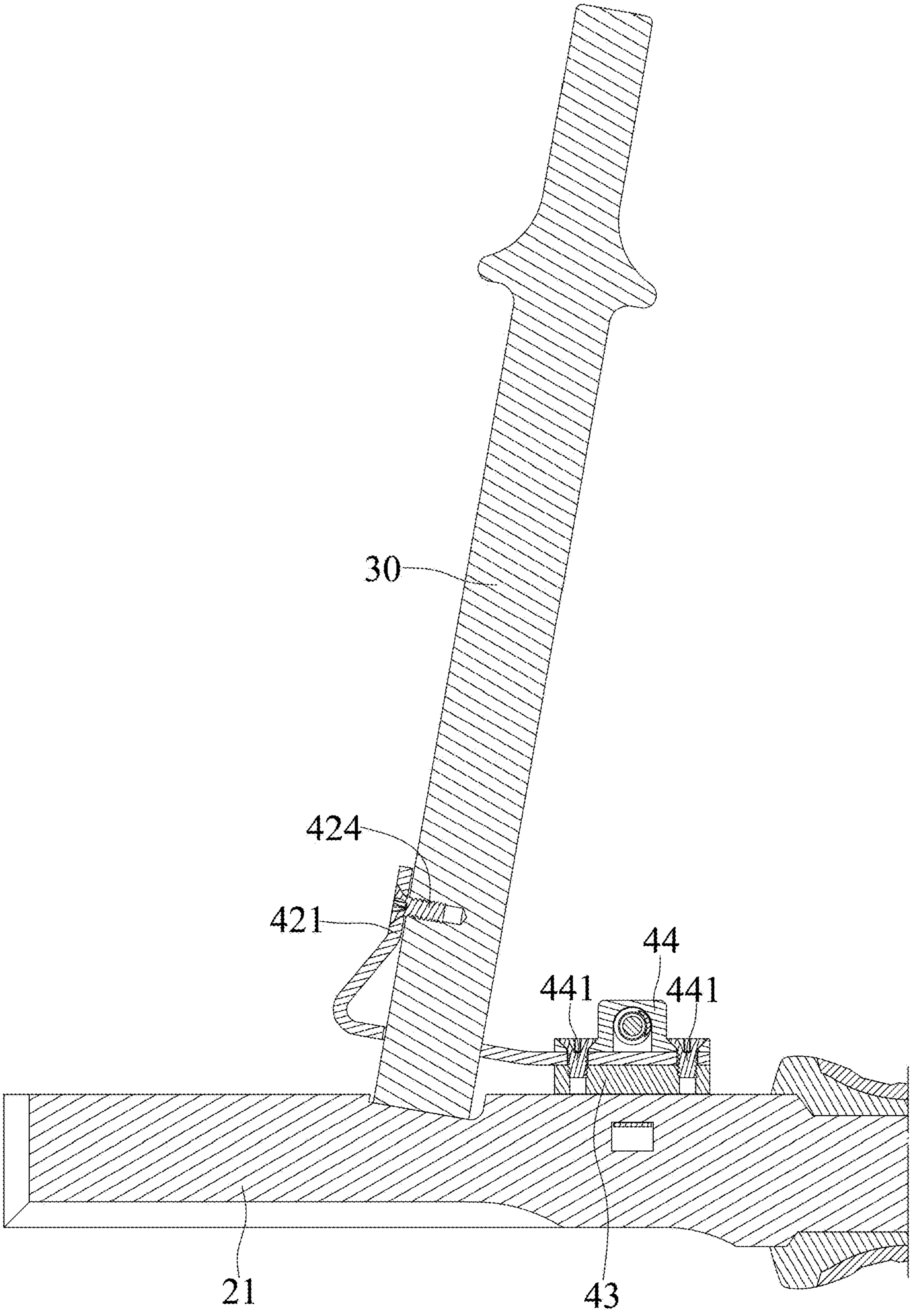
FIG. 3 is a cross-sectional view of the detachable pneumatic hammer tool according to the present invention.
Figure 4:
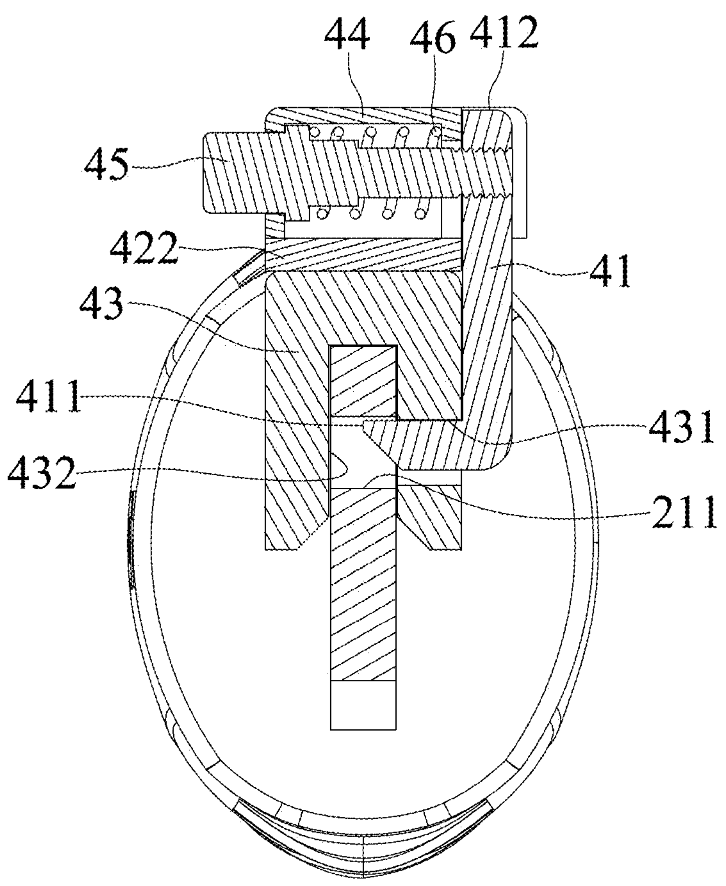
FIG. 4 is a cross-sectional view of the detachable pneumatic hammer tool, showing the fastener in a fastening position.
Figure 5:
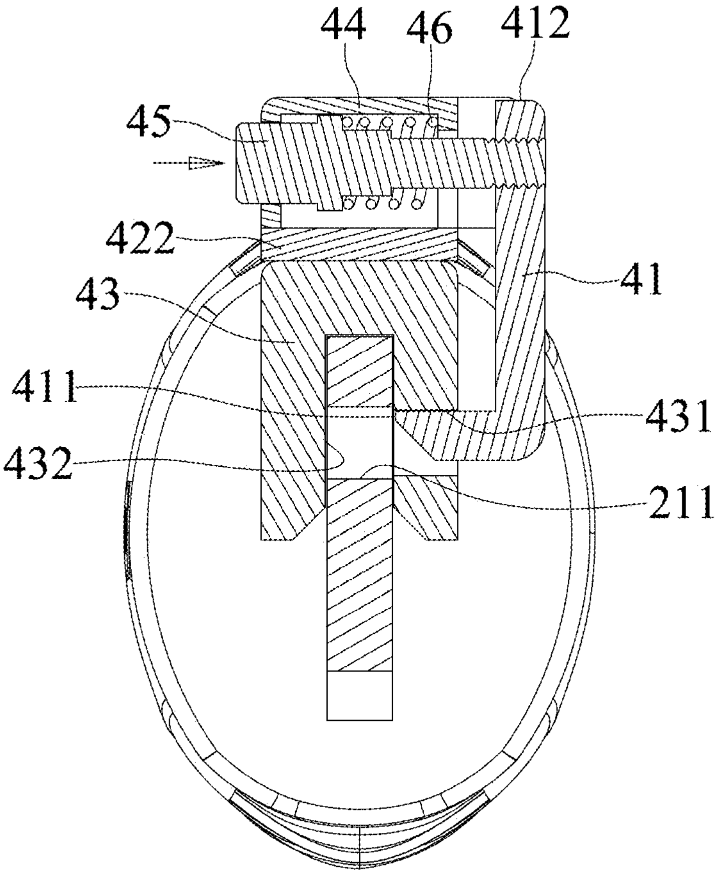
FIG. 5 is a cross-sectional view of the detachable pneumatic hammer tool, showing the fastener moved to a release position.

FIGS. 1-5 show a detachable pneumatic hammer tool 10 according to the present invention. The body 20 includes a tool head 21. The pneumatic rod 30 has a first end configured to be connected to a pneumatic tool, and a second end detachably connected to the tool head 21. The connector 40 is fixedly connected to the pneumatic rod 30.

Further, the tool head 21 is provided with an insertion slot 211. The connector 40 includes a fastener 41 movable between a fastening position and a release position. When the fastener 41 is in the fastening position, the fastener 41 is inserted into the insertion slot 211 to prevent detachment of the pneumatic rod 30 from the tool head 21. When the fastener 41 is in the release position, the fastener 41 is disengaged from the insertion slot 211 to allow detachment of the pneumatic rod 30 from the tool head 21.

The connector 40 includes a first coupling seat 42 and a second coupling seat 43. The first coupling seat 42 is fixedly sleeved around an outer periphery of the pneumatic rod 30 in a radial direction. One end of the second coupling seat 43 is connected to the first coupling seat 42 and another end is slidably sleeved onto the tool head 21 in a direction parallel to an axial direction of the pneumatic rod 30.

The second coupling seat 43 is provided with a side hole 431 corresponding to the insertion slot 211. One end of the fastener 41 is provided with a fastening portion 411 and another end is provided with a connecting portion 412. The fastening portion 411 is inserted into the side hole 431 and selectively inserted into or withdrawn from the insertion slot 211. The connector 40 includes a control seat 44 and a press button 45. The control seat 44 is connected to a side of the first coupling seat 42 opposite to the second coupling seat 43. The press button 45 is reciprocally inserted into the control seat 44. One end of the press button 45 protrudes from the control seat 44 and another end is connected to the connecting portion 412 so as to move synchronously with the fastener 41.

The connector 40 further includes an elastic member 46 disposed in the control seat 44 and sleeved around the press button 45. One end of the elastic member 46 abuts against an inner periphery of the control seat 44, and another end abuts against the press button 45, such that the elastic member 46 is configured to bias the press button 45 and to drive the fastener 41 toward the fastening position.

In the embodiment, the tool head 21 is formed as a plate and is provided with a working portion 212 and a back portion 213 opposite to the working portion 212. One end of the pneumatic rod 30 connected to the tool head 21 is provided with a first coupling slot 31 extending linearly in a radial direction of the pneumatic rod 30. The first coupling slot 31 is sleeved on the back portion 213. The second coupling seat 43 is provided with a second coupling slot 432 linearly extending in the radial direction of the pneumatic rod 30. The second coupling slot 432 is in communication with the side hole 431 and is sleeved on the back portion 213.

The back portion 213 is recessed with a notch 214. The first coupling slot 31 engages with the notch 214.

The body 20 includes a handle 22 connected to one end of the tool head 21.

One end of the first coupling seat 42 is provided with a fixing portion 421, and another end is provided with an assembling portion 422. A collar portion 423 is disposed between the fixing portion 421 and the assembling portion 422. The collar portion 423 is sleeved around an outer periphery of the pneumatic rod 30 in the radial direction thereof and is fixed to the pneumatic rod 30 via the fixing portion 421. The second coupling seat 43 and the control seat 44 are respectively connected to two opposite sides of the assembling portion 422.

The first coupling seat 42 is connected with a fixing member 424. The fixing member 424 penetrates through the fixing portion 421 and is threadedly connected to the pneumatic rod 30. The control seat 44 is connected with two assembling members 441. The two assembling members 441 respectively penetrate through the control seat 44 and the assembling portion 422 and are threadedly connected to the second coupling seat 43.

The detachable pneumatic hammer tool 10 is capable of reducing its overall volume through the aforementioned structure. In the present embodiment, the detachable pneumatic hammer tool 10 may be implemented as a scraper, and the blade surface of the scraper must extend in the radial direction of the pneumatic rod 30. Owing to the detachable design between the body 20 and the pneumatic rod 30, the body 20 and the pneumatic rod 30 can be placed side by side during packaging, thereby reducing the overall volume.

Although specific embodiments have been illustrated and described, numerous modifications and variations are still possible without departing from the scope of the invention. The scope of the invention is limited by the accompanying claims.

The invention claimed is:

1. A detachable pneumatic hammer tool comprising:

a body including a tool head, wherein the tool head is provided with an insertion slot;

a pneumatic rod having a first end configured to be connected to a pneumatic tool, and a second end detachably connected to the tool head; and a connector fixedly connected to the pneumatic rod, wherein the connector includes a fastener movable between a fastening position and a release position;

wherein when the fastener is in the fastening position, the fastener is inserted into the insertion slot to prevent detachment of the pneumatic rod from the tool head; and wherein when the fastener is in the release position, the fastener is disengaged from the insertion slot to allow detachment of the pneumatic rod from the tool head.

2. The detachable pneumatic hammer tool of claim 1, wherein the connector includes a first coupling seat and a second coupling seat, wherein the first coupling seat is fixedly sleeved around an outer periphery of the pneumatic rod in a radial direction, and wherein one end of the second coupling seat is connected to the first coupling seat and another end is slidably sleeved onto the tool head in a direction parallel to an axial direction of the pneumatic rod.

3. The detachable pneumatic hammer tool of claim 2, wherein the second coupling seat is provided with a side hole corresponding to the insertion slot, wherein one end of the fastener is provided with a fastening portion and another end is provided with a connecting portion, wherein the fastening portion is inserted into the side hole and selectively inserted into or withdrawn from the insertion slot, wherein the connector includes a control seat and a press button, wherein the control seat is connected to a side of the first coupling seat opposite to the second coupling seat, wherein the press button is reciprocally inserted into the control seat, wherein one end of the press button protrudes from the control seat and another end is connected to the connecting portion so as to move synchronously with the fastener.

4. The detachable pneumatic hammer tool of claim 3, wherein the connector further includes an elastic member disposed in the control seat and sleeved around the press button, wherein one end of the elastic member abuts against an inner periphery of the control seat, and another end abuts against the press button, such that the elastic member is configured to bias the press button and to drive the fastener toward the fastening position.

5. The detachable pneumatic hammer tool of claim 3, wherein the tool head is formed as a plate and is provided with a working portion and a back portion opposite to the working portion, wherein one end of the pneumatic rod connected to the tool head is provided with a first coupling slot extending linearly in a radial direction of the pneumatic rod, wherein the first coupling slot is sleeved on the back portion, wherein the second coupling seat is provided with a second coupling slot linearly extending in the radial direction of the pneumatic rod, and wherein the second coupling slot is in communication with the side hole and is sleeved on the back portion.

6. The detachable pneumatic hammer tool of claim 5, wherein the back portion is recessed with a notch, and wherein the first coupling slot engages with the notch.

7. The detachable pneumatic hammer tool of claim 5, wherein the body includes a handle connected to one end of the tool head.

8. The detachable pneumatic hammer tool of claim 3, wherein one end of the first coupling seat is provided with a fixing portion, and another end is provided with an assembling portion, wherein a collar portion is disposed between the fixing portion and the assembling portion, wherein the collar portion is sleeved around the outer periphery of the pneumatic rod in the radial direction thereof and is fixed to the pneumatic rod via the fixing portion, and wherein the second coupling seat and the control seat are respectively connected to two opposite sides of the assembling portion.

9. The detachable pneumatic hammer tool of claim 8, wherein the first coupling seat is connected with a fixing member, wherein the fixing member penetrates through the fixing portion and is threadedly connected to the pneumatic rod, wherein the control seat is connected with two assembling members, and wherein the two assembling members respectively penetrate through the control seat and the assembling portion and are threadedly connected to the second coupling seat.

* * * * *